United States Patent
Lin et al.

(10) Patent No.: US 9,861,975 B2
(45) Date of Patent: Jan. 9, 2018

(54) VISIBLE LIGHT RESPONSE CATALYST STRUCTURE AND PROCESS FOR MANUFACTURING THE SAME

(71) Applicant: NATIONAL APPLIED RESEARCH LABORATORIES, Taipei (TW)

(72) Inventors: Chun-Ting Lin, Taipei (TW);
Ming-Hua Shiao, Taipei (TW);
Mao-Nan Chang, Taipei (TW);
Nien-Nan Chu, Taipei (TW);
Chien-Nan Hsiao, Taipei (TW);
Fan-Gang Tseng, Taipei (TW)

(73) Assignee: NATIONAL APPLIED RESEARCH LABORATORIES, Taipei (TW)

( * ) Notice: Subject to any disclaimer, the term of this patent is extended or adjusted under 35 U.S.C. 154(b) by 336 days.

(21) Appl. No.: 14/558,750

(22) Filed: Dec. 3, 2014

(65) Prior Publication Data

US 2016/0158740 A1 Jun. 9, 2016

(51) Int. Cl.
| | | |
|---|---|---|
| *B01J 37/00* | (2006.01) | |
| *B01J 37/34* | (2006.01) | |
| *B01J 27/13* | (2006.01) | |
| *B01J 27/10* | (2006.01) | |
| *B01J 23/50* | (2006.01) | |
| *B01J 23/52* | (2006.01) | |
| *B01J 23/42* | (2006.01) | |
| *B01J 23/44* | (2006.01) | |
| *B01J 35/00* | (2006.01) | |
| *B01J 37/02* | (2006.01) | |
| *B01J 35/10* | (2006.01) | |

(52) U.S. Cl.
CPC ............ *B01J 37/348* (2013.01); *B01J 23/42* (2013.01); *B01J 23/44* (2013.01); *B01J 23/50* (2013.01); *B01J 23/52* (2013.01); *B01J 27/10* (2013.01); *B01J 27/13* (2013.01); *B01J 35/004* (2013.01); *B01J 35/0013* (2013.01); *B01J 35/10* (2013.01); *B01J 37/0209* (2013.01); *B01J 37/0217* (2013.01); *B01J 37/0244* (2013.01)

(58) Field of Classification Search
CPC ............................. B01J 35/004; B01J 37/348
See application file for complete search history.

(56) References Cited

PUBLICATIONS

Shim et al., "One dimensional Ag/Au/AgCl nanocomposites stemmed from Ag nanowires for electrocatalysis of oxygen reduction," Journal of Materials Chemistry 22, pp. 15285-15290, May 2012.*
Ye et al., "Controllable growth of silver nanostructures by a simple replacement reaction and their SERS studies," Solid State Sciences 11(6), pp. 1088-1093, Jun. 2009.*
Yang et al., "Galvanic deposition and electrocatalytic oxygen reduction of standing Pt/AgCl-coated Ag nanosheets," Journal of Solid State Electrochemistry 19(3), pp. 663-670, Oct. 2014.*

* cited by examiner

*Primary Examiner* — Melvin C Mayes
*Assistant Examiner* — Stefanie Cohen
(74) *Attorney, Agent, or Firm* — Chih Feng Yeh; Huntington IP Consulting Co., Ltd.

(57) ABSTRACT

A visible light response photocatalyst structure and a process for manufacturing the same are disclosed, where the structure is manufactured by the GRR for two times, so that the structure has a large surface area, high surface activity, being apt to get integrated with a silicon substrate and endurable to the environment, and further has the rapid and simple manufacturing characteristics without any additional energy required and has a high reproductively.

8 Claims, 19 Drawing Sheets

21

21

21

21

23

VISIBLE LIGHT RESPONSE CATALYST STRUCTURE AND PROCESS FOR MANUFACTURING THE SAME

BACKGROUND OF THE RELATED ART

Technical Field

The present invention relates to a nano-structure and a manufacturing process, and particularly to a visible light response photocatalyst structure and a process for manufacturing the same.

Related Art

Galvanic replacement reaction (GRR) is an old and versatile electrochemical reaction used for metallic transformation and has been widely adopted in engineering nano-composites. By utilizing the reduction potential difference within metals as driving force, metallic transformation can be completed in few minutes without any external energy applied in GRR.

The mechanism of sequential galvanic exchange and Kirkendall growth of polymetallic hollow nanoparticles. Various hollow metallic structures and metal-semiconductor junctions have been proposed via GRR, including Pt nanotubes, Au nanocages, Pt—$Mn_3O_4$, Pt—AgCl, $Bi_2Te_3$, Ag—Si, Au—Si, and etc.

The aforesaid hollow or composites structures covers almost all of the fields in chemistry, including methanol oxidation reaction (MOR), ethanol oxidation reaction (EOR), oxygen reduction reaction (ORR), surface enhanced Raman scattering (SERS), thermoelectric devices, degradation of pollutants, tumor detection, and etc.

Extending the GRR to the transformation between $Mn_3O_4$ and $Fe_2O_3$, this created more possibility for engineering novel nano-composites.

Silver-silver chloride (Ag—AgCl) composite has been utilized as visible-light active photo-catalyst recently because of the unique self-sensitized property. The direct band gap and indirect band gap of AgCl are 5.6 eV and 3.25 eV, respectively. As generally agreed, the presence of Ag enables a new electronic transition from the valance band of AgCl to the cluster energy levels of Ag, which is lower than the band gap of AgCl. This new energy gap enables visible-light response of Ag—AgCl composites.

The photo-generated holes combine with Cl— of AgCl and form chlorine radical ($Cl^0$), and the photo-generated electrons then transfer to the ubiquitous oxygen in the electrolyte to form super oxygen radical ($O_2^-$). Both of them have strong capability for pollutant degradation.

A visible-light active AgCl—Ag composite sub-micron composite for MO degradation. Ag (core)-AgCl (shell) hybrid structure for the degradation of Rhodamine B (RhB). Recently, the evidence of hot electron transfer from Ag to AgCl under visible light irradiation.

Metallic complexes, e.g. $PtCl_6^{2-}$, $PdCl_4^{2-}$, $AuCl_4^-$, $AuCl_2^-$, and etc., are typical metallic precursors used in wet chemical process. The formation of AgCl(s) precipitate is consequently inevitable when adopting the aforesaid complexes to react with Ag in GRR. Most of previous studies deemed AgCl(s) as contamination.

Several processes have been proposed to remove AgCl(s), including NaCl wash, refluxing, and $NH_4OH$(aq) wash. One dimensional Ag/AgCl/Au nanocomposites by reacting Ag with $AuCl_4^-$ for ORR. The AgCl was utilized to stabilize the nanostructure, and the photo-response was not discussed. A galvanic replacement process transforming Ag/AgCl nanowires to Pt/AgCl nanotubes by utilizing $H_2PtCl_6$. Nevertheless, the photo-catalytic property of the Pt/AgCl composites was not reported neither. To our knowledge, there exist seldom prior arts that use GRR between metal and metallic precursors for preparing photo-catalysts.

That gave us a strong motivation to study photo-catalysts generated from GRR. A simple GRR was proposed to prepare AgCl modified Pt—Ag dendritic nanotubes (DNTs) for visible-light active photo-electrodes.

In view of the above, the prior art does not adopt the Galvanic GRR for manufacturing the light visible response photocatalyst structure, there is quite a need to set forth an improvement means to settle down this problem.

SUMMARY

In view of the above, the prior art does not adopt a Galvanic replacement reaction (GRR) for manufacturing a light visible response photocatalyst structure; the present invention discloses a light visible response photocatalyst structure and a process for manufacturing the same.

According to the present invention, the light visible response photocatalyst structure, comprising a silicon substrate; a silver nano-layer, growing on a surface of the silicon substrate through a first Galvanic replacement reaction (GRR) and having a solid dendritic shape after experiencing the first GRR; a precious metal layer, growing on a surface of the silver nano-layer through a second GRR; and a silver chloride layer, growing on a surface of the precious metal layer through the second GRR, wherein the silver-nano-layer has a hollow dendritic shape after experiencing the second GRR.

The first GRR is a fluorine ions assisted GRR, so that the silver nano-layer grows on the surface of the silicon substrate.

The precious metal layer has a precious metal material portion comprising gold (Au), palladium (Pd), and platinum (Pt).

The first GRR has a reaction equation: $Si+4Ag^+ + 6HF \rightarrow 4Ag+H_2SiF_6+4H^+$.

The second GRR has a reaction equation: $4Ag+(PtCl_6)^{2-} \rightarrow Pt+4AgCl+2Cl^-$.

The second GRR has a reaction equation: $4Ag+ HAuCl_4 \rightarrow Au+4AgCl+\frac{1}{2}H_2$.

The light visible response photocatalyst structure is a AgCl—Pt—Ag composite structure viewed from an inward direction.

The light visible response photocatalyst structure is a AgCl—Au—Ag composite structure viewed from an inward direction.

According to the present invention, the process for manufacturing a light visible response photocatalyst structure, comprising steps of providing a silicon substrate; growing a silver nano-layer on a surface of the silicon substrate through a first Galvanic replacement reaction (GRR), the silver nano-layer having a solid dendritic shape after experiencing the first GRR; growing a precious metal layer on a surface of the silver nano-layer through a second GRR; and growing a silver chloride layer on a surface of the precious metal layer through the second GRR, wherein the silver-nano-layer has a hollow dendritic shape after experiencing the second GRR.

The first GRR is a fluorine ions assisted GRR, so that the silver nano-layer grows on the surface of the silicon substrate.

The precious metal layer has a precious metal material portion comprising gold (Au), palladium (Pd), and platinum (Pt).

The first GRR has a reaction equation: $Si+4Ag^{+}+6HF \rightarrow 4Ag+H_2SiF_6+4H^{+}$.

The second GRR has a reaction equation: $4Ag+(PtCl_6)^{2-} \rightarrow Pt+4AgCl+2Cl^{-}$.

The second GRR has a reaction equation: $4Ag+HAuCl_4 \rightarrow Au+4AgCl+½H_2$. The light visible response photocatalyst structure is a AgCl—Pt—Ag composite structure viewed from an inward direction.

The light visible response photocatalyst structure is a AgCl—Au—Ag composite structure viewed from an inward direction.

The structure and process have the difference as compared to the prior art that the visible light response photocatalyst structure is manufactured by the GRR for two times, so that the structure has a large surface area, high surface activity, being apt to get integrated with a silicon substrate and endurable to the environment, and further has the rapid and simple manufacturing characteristics without any additional energy required and has a high reproductively.

By using the above technical means, the present invention may achieve in manufacture of the visible light response photocatalyst structure by using the GRR.

BRIEF DESCRIPTION OF THE DRAWINGS

The present invention will be better understood from the following detailed descriptions of the preferred embodiments according to the present invention, taken in conjunction with the accompanying drawings, in which.

DETAILED DESCRIPTION

The present invention will be apparent from the following detailed description, which proceeds with reference to the accompanying drawings, wherein the same references relate to the same elements.

Figure 1:
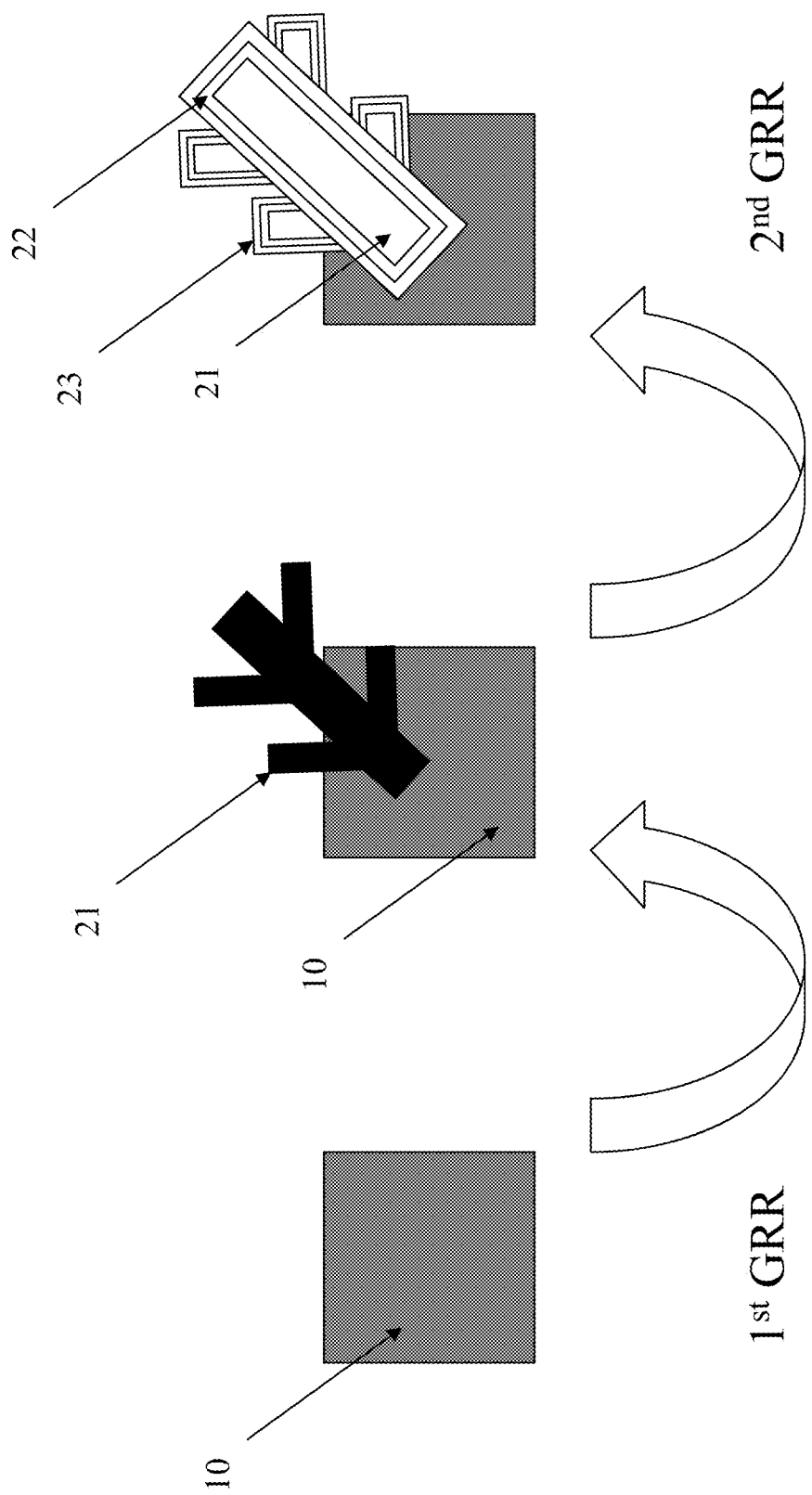
FIG. 1 is a schematic diagram of a side view of a visible light response photocatalyst structure according to the present invention.
Figure 2:
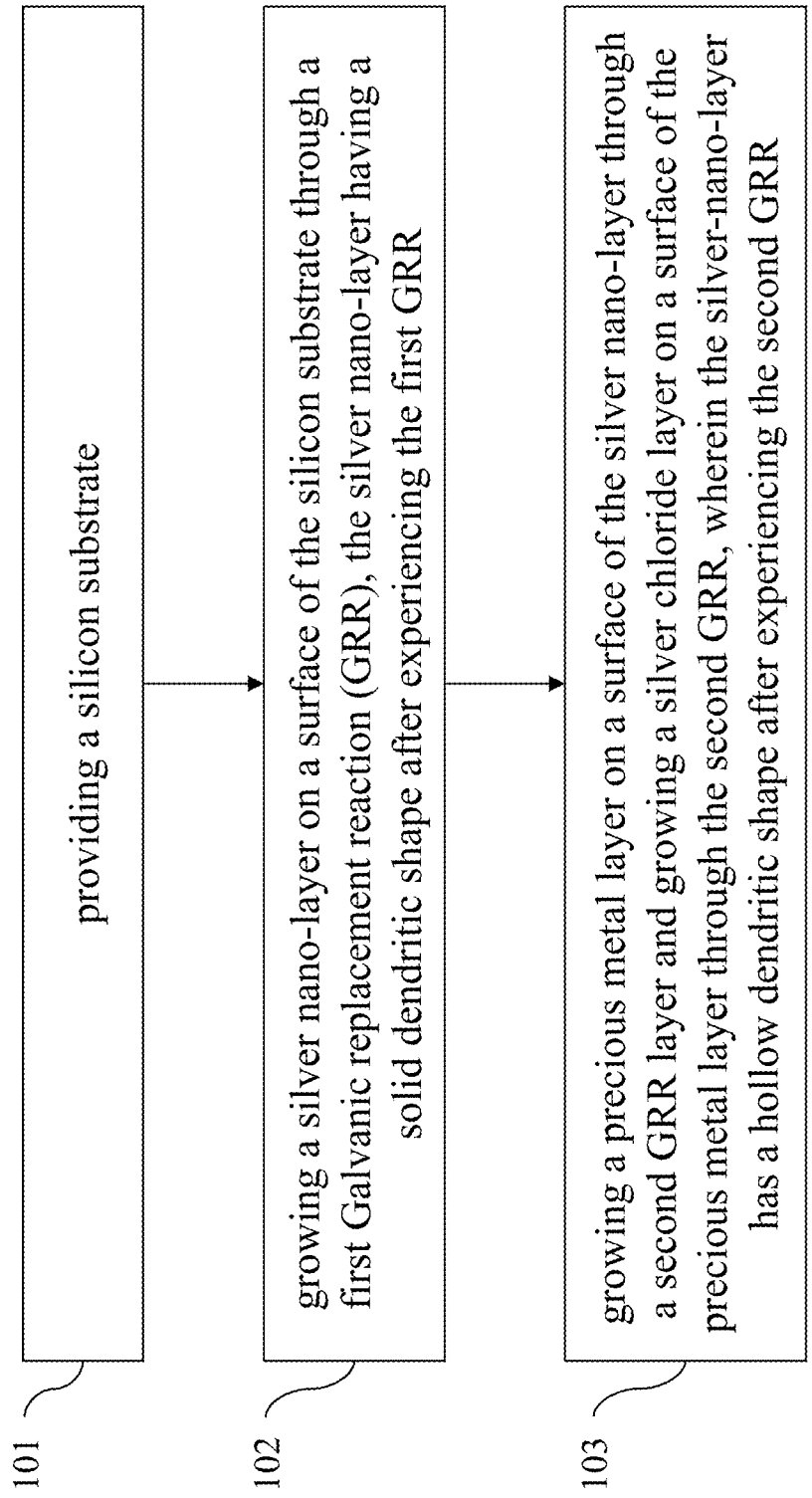
FIG. 2 is a flowchart of a method for manufacturing the visible light response photocatalyst structure according to the present invention.

In the following, the visible light response photocatalyst structure and a process for manufacturing the same according to the present invention will be described as follows, with simultaneous reference to FIG. 1 and FIG. 2, in which FIG. 1 is a schematic diagram of a side view of a visible light response photocatalyst structure according to the present invention, while FIG. 2 is a flowchart of a method for manufacturing the visible light response photocatalyst structure according to the present invention.

The visible light response photocatalyst structure of the present invention comprises a silicon substrate 10, a silver nano-layer 21, a precious metal layer 22 and a silver chloride layer 23.

In the present invention, the galvanic replacement reaction (GRR) is used to manufacture a visible light response photocatalyst structure. At first, a silicon substrate 10 is provided. The silicon substrate 10 may have an unlimited shape and size. Assume the silicon substrate 10 is a cubic body with each side length of 2 cm. The silicon substrate 10 is placed into a solution having HF and $Ag^{+}$ therein. The silicon substrate 10, HF, and $Ag^{+}$ are subject to a first GRR for 5 min, which is merely an example without limiting the present invention, and may be 8 min., 1 hr., 24 hr., etc. The first GRR is the fluoride assisted GRR, and has the reaction equation of $Si+4Ag^{+}+6HF \rightarrow 4Ag+H_2SiF_6+4H^{+}$. In this manner, a silver nano-layer 21 could grow on the silicon substrate 10, and such grown silver nano-layer has a solid dendritic shape (S101).

Figure 3A:
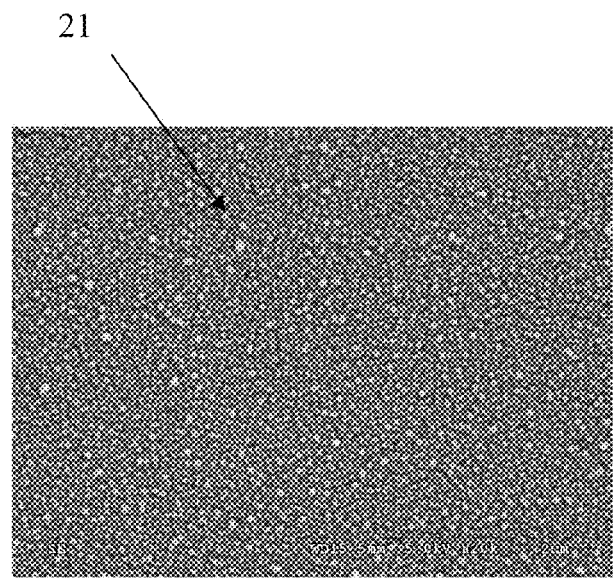
FIG. 3A through FIG. 3F are actual structural plan-diagrams of the visible light response photocatalyst structure only having a silver nano-layer obtained at different time points according to the present invention, respectively.
Figure 3B:
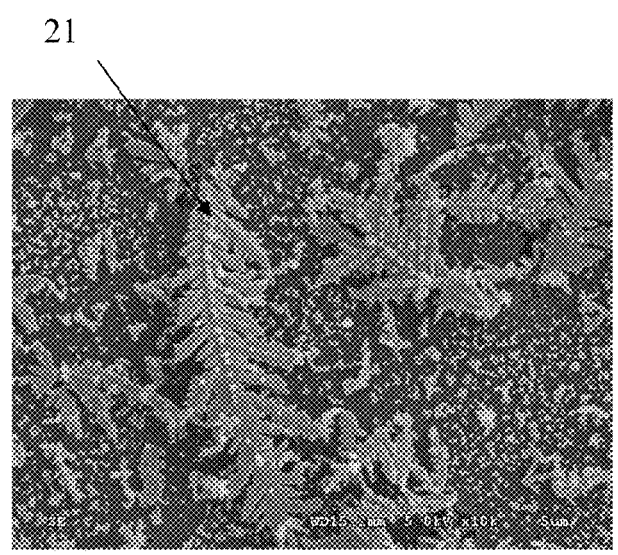
Figure 3C:
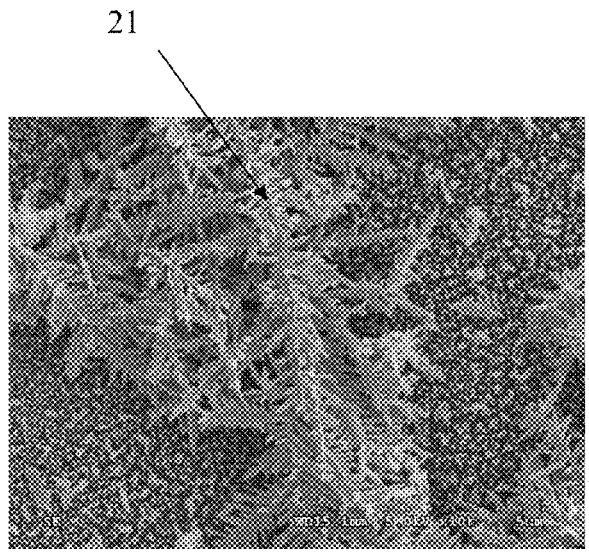
Figure 3D:
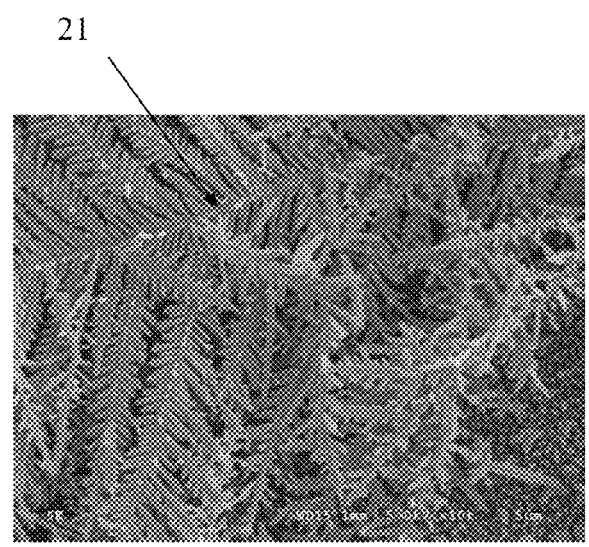
Figure 3E:
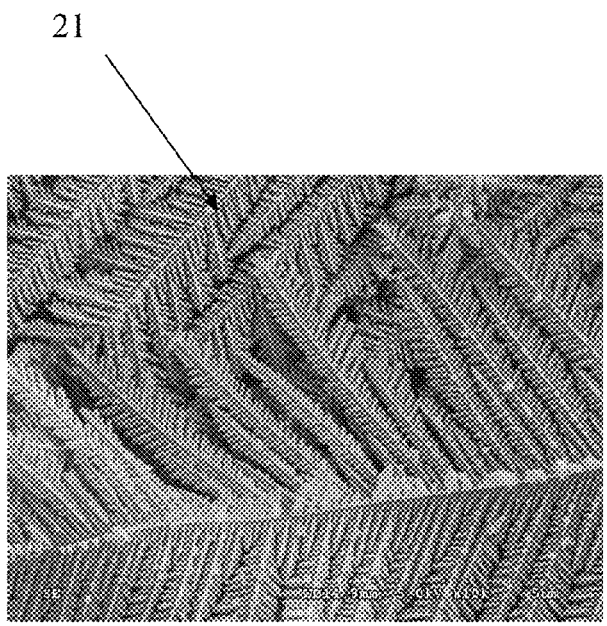
Figure 3F:
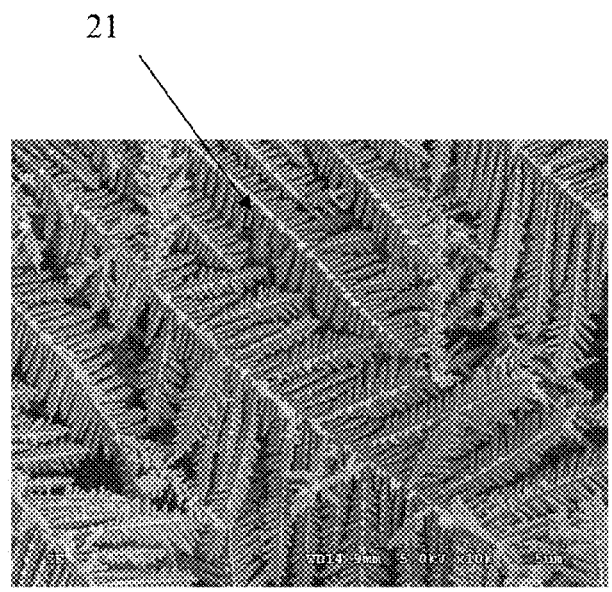
Figure 3G:
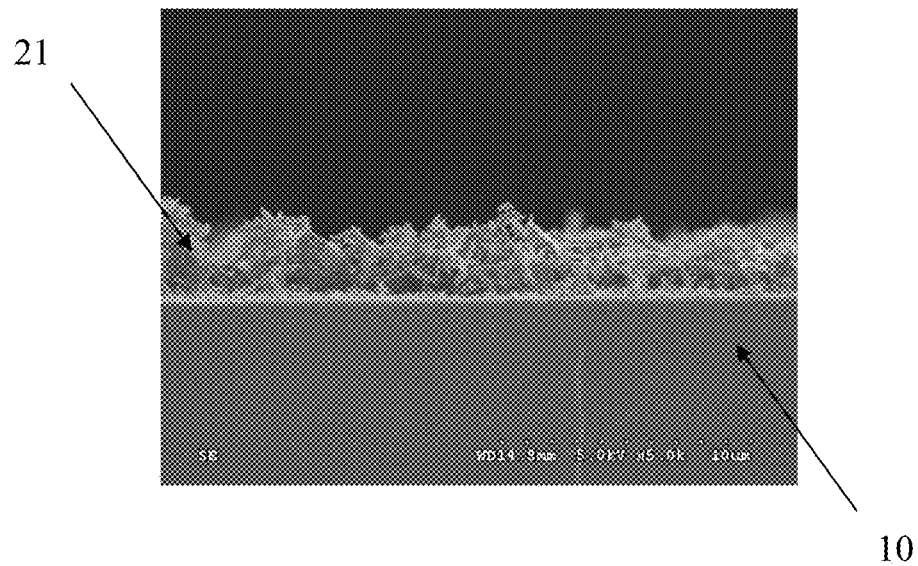
FIG. 3G through FIG. 3I are actual structural plan-diagrams of the visible light response photocatalyst structure only having the silver nano-layer obtained at different time points according to the present invention, respectively.
Figure 3H:
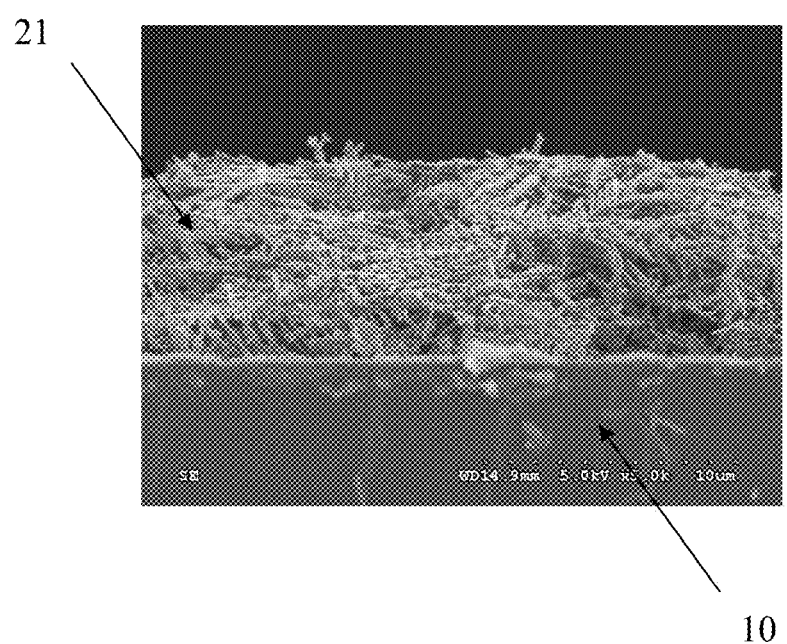
Figure 3I:
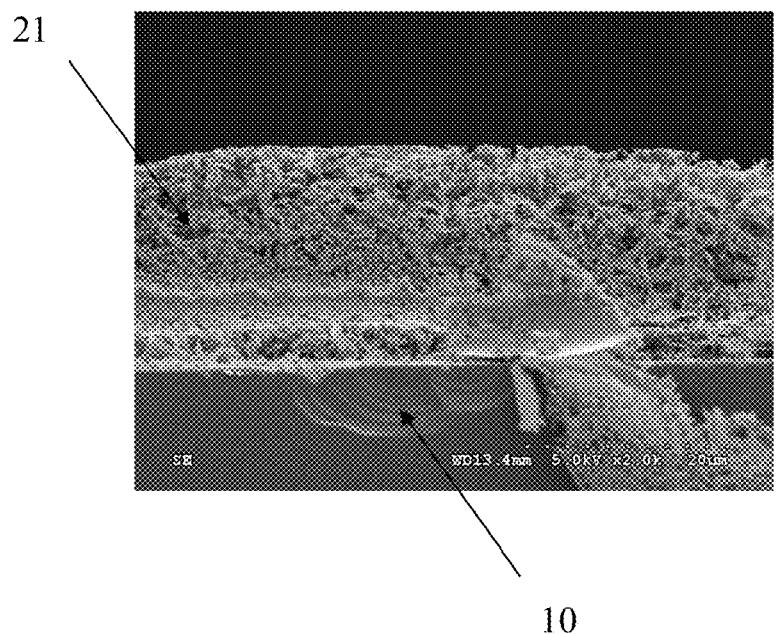

Thereafter, referring to FIG. 3A through FIG. 3F and FIG. 3G through FIG. 3I, in which FIG. 3A through FIG. 3F are actual structural plan-diagrams of the visible light response photocatalyst structure only having a silver nano-layer obtained at different time points according to the present invention, respectively, while FIG. 3G through FIG. 3I are actual structural plan-diagrams of the visible light response photocatalyst structure only having the silver nano-layer obtained at different time points according to the present invention, respectively.

FIG. 3A involves a scale bar of 2 μm, and shows the silver nano-layer 21 grown in the case where the silicon substrate 10, HF and $Ag^{+}$ are subject to the first GRR for a reaction time of 20 seconds. It may be apparently known that a solid silver nano-layer 21 has been grown on the silicon substrate 10 within a short time.

FIG. 3B involves a scale bar of 5 μm, and shows the silver nano-layer 21 grown in the case where the silicon substrate 10, HF and $Ag^{+}$ are subject to the first GRR for a reaction time of 40 seconds. It may be apparently known that a solid silver nano-layer 21 has been grown on the silicon substrate 10 within the 40-seconds time, and the silver nano-layer 21 grows gradually to have a dendritic shape.

FIG. 3C involves a scale bar of 5 µm, and shows the silver nano-layer 21 grown in the case where the silicon substrate 10, HF and Ag$^+$ are subject to the first GRR for a reaction time of 80 seconds. It may be apparently known that a solid silver nano-layer 21 has been grown on the silicon substrate 10 within the 80-seconds time, and the silver nano-layer 21 grows gradually to have a dendritic shape.

FIG. 3D involves a scale bar of 5 µm while FIG. 3D involves a scale bar of 10 µm, which show the silver nano-layer 21 grown in the case where the silicon substrate 10, HF and Ag$^+$ are subject to the first GRR for a reaction time of 160 seconds, respectively. It may be apparently known that a solid silver nano-layer 21 has been grown on the silicon substrate 10 within the 160-seconds time, and the silver nano-layer 21 grows gradually to have a dendritic shape.

FIG. 3E involves a scale bar of 5 µm while FIG. 3D involves a scale bar of 10 µm, which show the silver nano-layer 21 grown in the case where the silicon substrate 10, HF and Ag$^+$ are subject to the first GRR for a reaction time of 300 seconds, i.e. 5 min., respectively. It may be apparently known that a solid silver nano-layer 21 has been grown on the silicon substrate 10 within the 300-seconds time, and the silver nano-layer 21 grows gradually to have a dendritic shape.

FIG. 3F involves a scale bar of 5 µm while FIG. 3D involves a scale bar of 20 µm, which show the silver nano-layer 21 grown in the case where the silicon substrate 10, HF and Ag$^+$ are subject to the first GRR for a reaction time of 480 seconds, i.e. 8 min., respectively. It may be apparently known that a solid silver nano-layer 21 has been grown on the silicon substrate 10 within the 480-seconds time, and the silver nano-layer 21 grows gradually to have a dendritic shape, which is simlar to that in the case of 300 seconds of growth.

Figure 4A:
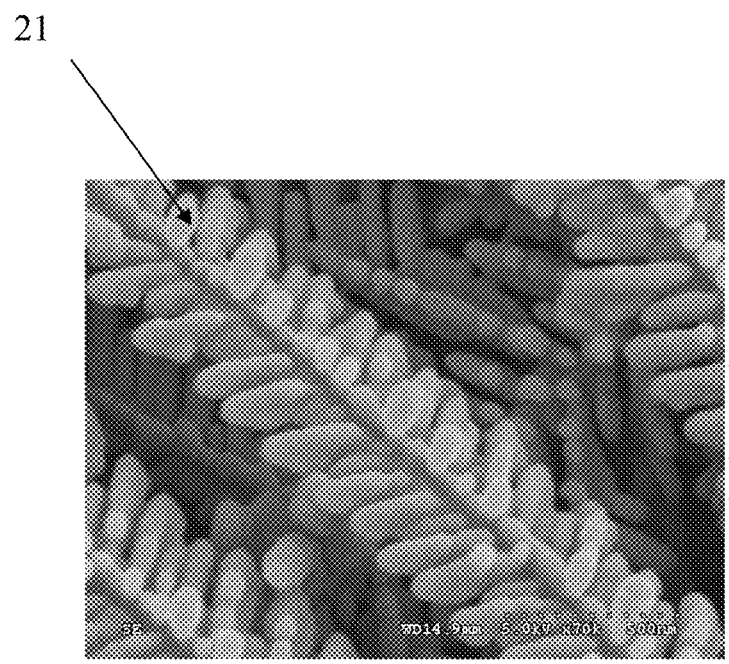
FIG. 4A through FIG. 4D are actual structural diagrams of the visible light response photocatalyst structure only having the silver nano-layer obtained by different magnifications and viewing angles according to the present invention, respectively.
Figure 4B:
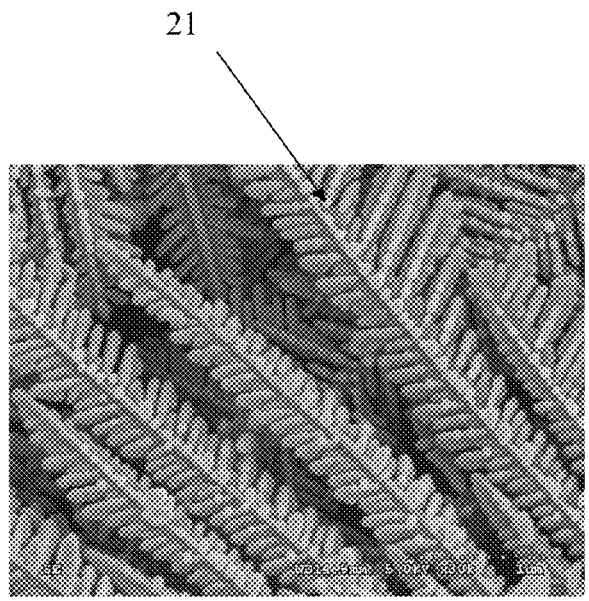
Figure 4C:
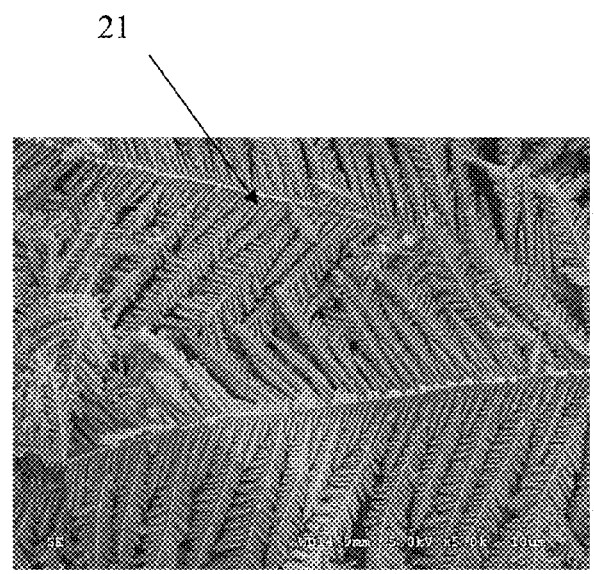
Figure 4D:
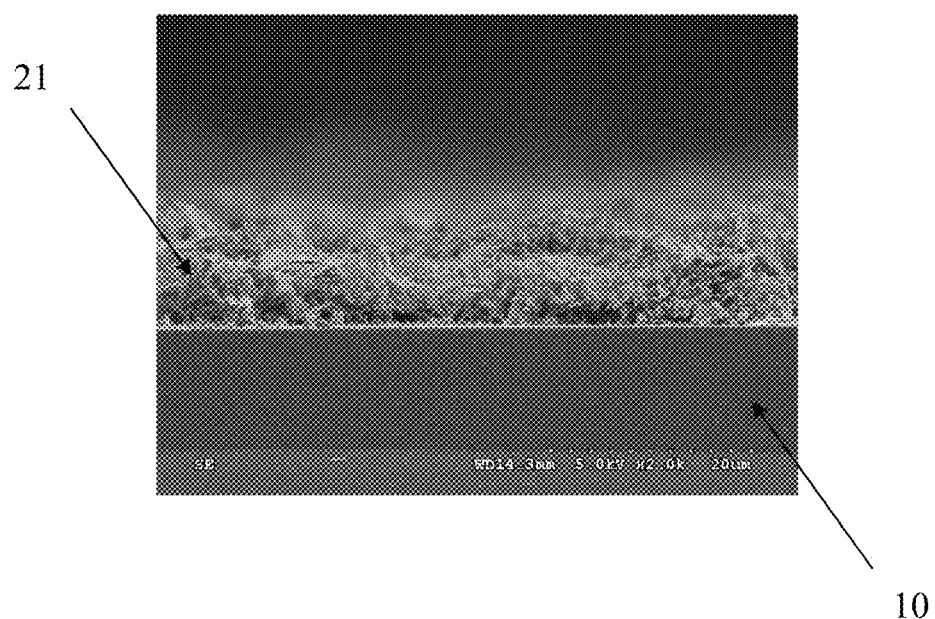

Thereafter, referring to FIG. 4A through FIG. 4D, actual structural plan-diagrams of the visible light response photocatalyst structure only having the silver nano-layer obtained at different magnifications and viewing angles according to the present invention are shown, respectively. FIG. 4A through FIG. 4D involve a scale bar of 500 nm, 1 µm, 10 µm, 10 µm, and 20 µm, respectively, and FIG. 4A through FIG. 4C show the silver nano-layer 21 as having the solid dendritic shape viewed from a plane viewing angle and with different magnifications, while FIG. 4D is obtained from a side view where the silicon substrate 10 may be readily known as having grown on the surface of the silicon substrate 10.

Figure 5A:
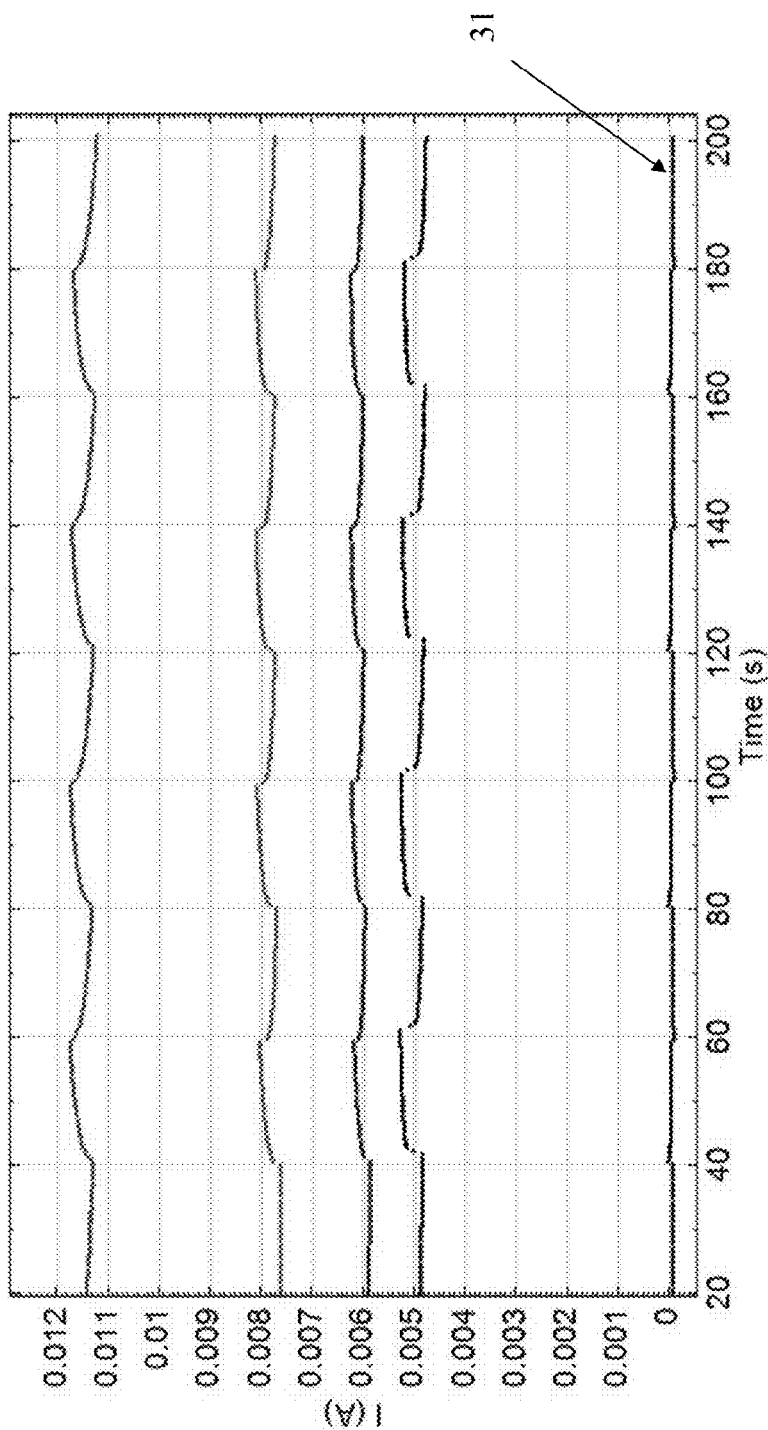
FIG. 5A is a visible light response diagram of the visible light response photocatalyst structure according to the present invention, respectively.
Figure 5B:
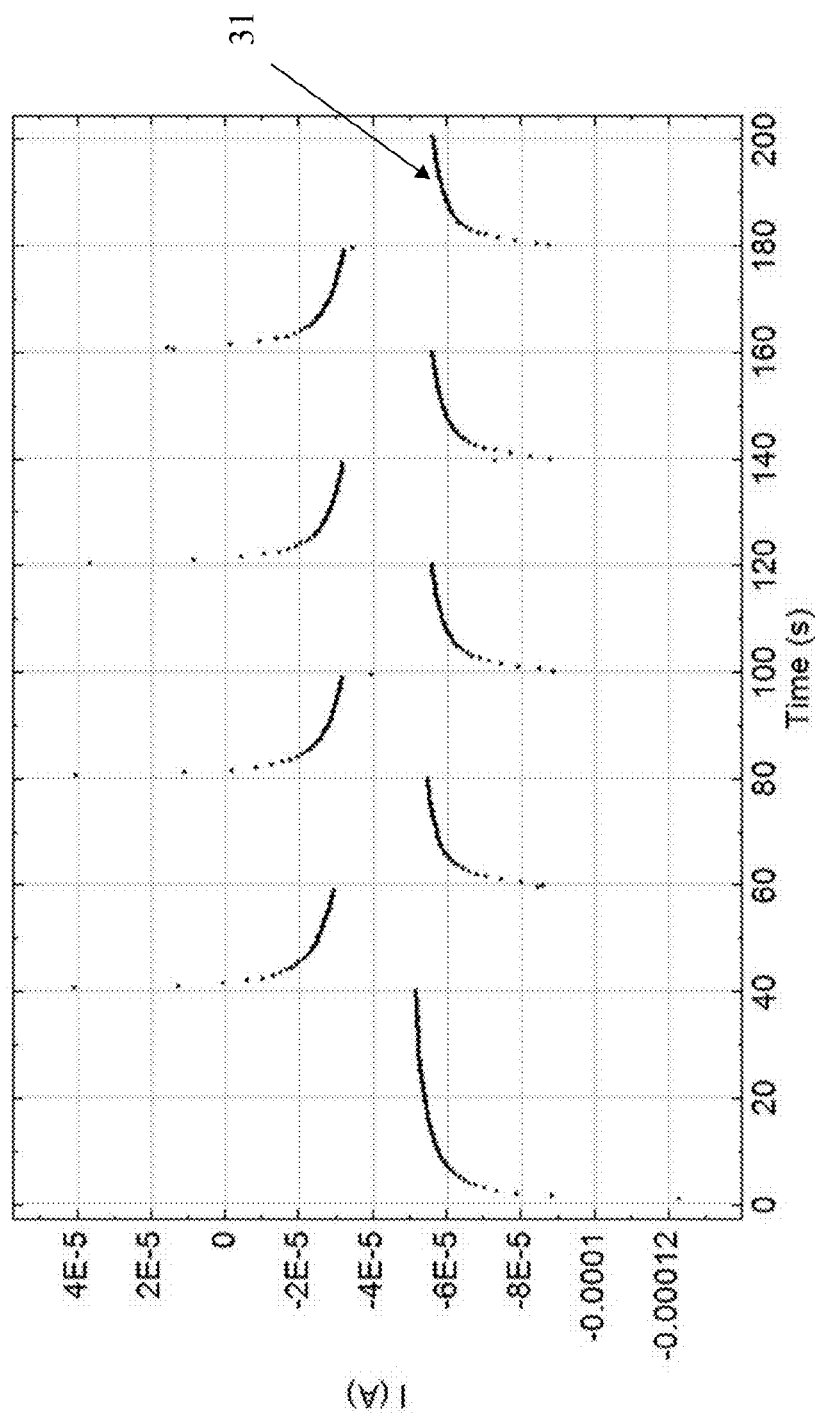
FIG. 5B is an amplified visible light response diagram of the visible light response photocatalyst structure only having the silver nano-layer according to the present invention.

Thereafter, FIG. 5A is a visible light response diagram of the visible light response photocatalyst structure according to the present invention, while FIG. 5B is an amplified visible light response diagram of the visible light response photocatalyst structure only having the silver nano-layer according to the present invention. As shown, a first data 31 indicates that the structure having only the silver nano-layer 21 and the silicon substrate 10 has already the visible light response, and FIG. 5B is an amplified diagram of FIG. 5A with respect to the first data 31.

To verify the structure only having the silver nano-layer 21 and the silicon substrate 10 has already the visible light response, the first data 31 is obtained by providing a visible light source at the 40$^{th}$ seconds, 80$^{th}$ seconds, 120$^{th}$ seconds, etc., to the silver nano-layer structure 21 and the silicon substrate 10. The result shows instantaneous data leaps are found on the first data 31 at the 40$^{th}$, 80$^{th}$, 120$^{th}$ seconds, and thus the evidence that the structure only having the silver nano-layer 21 and the silicon substrate 10 begins to have the visible light response at these time points is readily ascertained. Further, such structure may continuously maintain such visible light response. This may be evidenced by closing the visible light at some particular time points. On the first data 31, the data has a significant change at the 80$^{th}$, 120$^{th}$, 160$^{th}$, etc., respectively, and which corresponds to the time points when the visible light is closed. It may be thus readily known that the structure having only the silver-nano-layer 21 and the silicon substrate 10 does not show the visible light response again due to the absence of the visible light.

Referring again to FIG. 1 and FIG. 2, the only silver nano-layer 21 and the silicon substrate 10 structures may be reinforced. After the silver nano-layer 21 is grown on the surface of the silicon substrate 10 through the first GGR, the structure may be further placed into a solution having $PtCl_6^{2-}$, so that the silicon substrate 10, the silver nano-layer 21 and $PtCl_6^{2-}$ are jointly subject to a second GRR for 5 min. For reinforcing the structure having only the silver nano-layer 21 and the silicon substrate 10, which is merely an example without limiting the present invention, and may be 8 min., 1 hr., 24 hr., etc. The second GRR has the reaction equation: $4Ag-(PtCl_6)^{2-} \rightarrow Pt+4AgCl+2Cl^-$. In this manner, the precious metal layer 22 could grow on the surface of the silver nano-layer 21, and a silver chloride layer 23 could grow on a surface of the precious metal layer 22. And, grown silver nano-layer 21 has a hollow dendritic shape (S102). The visible light response catalyst structure is thus completed, and this structure is a AgCl—Pt—Ag composite structure from an inward view.

Figure 6A:
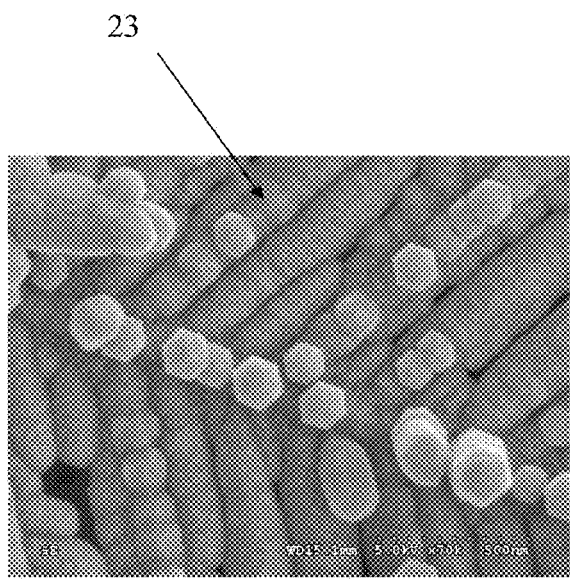
FIG. 6A through FIG. 6C are actual structural diagrams of the visible light response photocatalyst structure obtained by different magnifications according to a first aspect of the present invention, respectively.
Figure 6B:
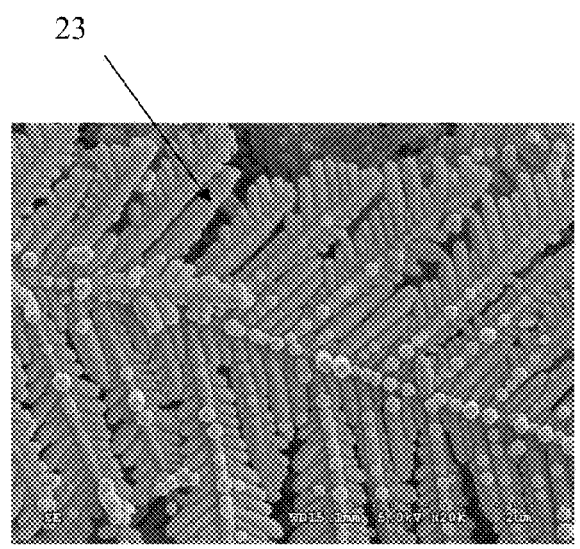
Figure 6C:
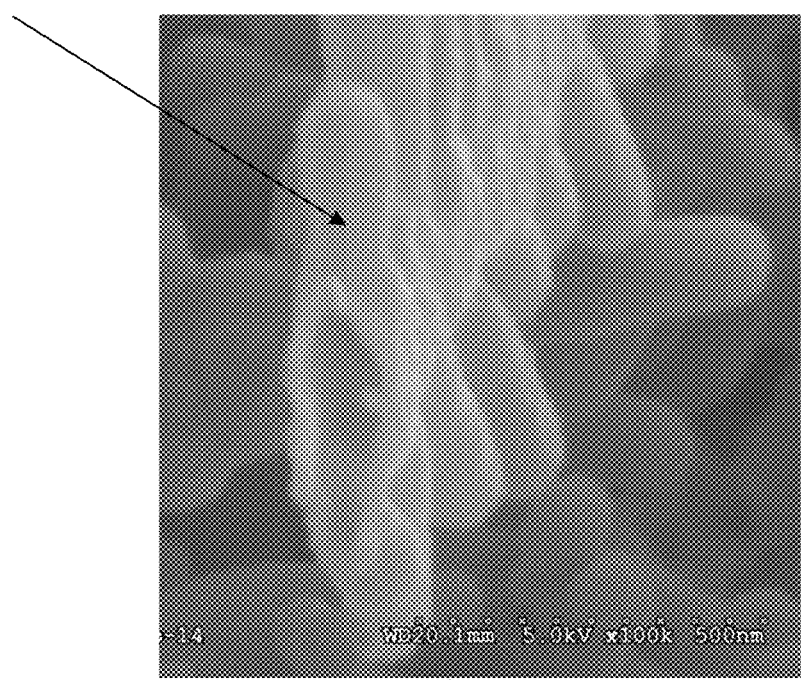

Referring to FIG. 6A through FIG. 6C, actual structural diagrams of the visible light response photocatalyst structure obtained by different magnifications according to a first aspect of the present invention are shown therein, respectively.

FIG. 6A involves a scale bar of 500 nm, FIG. 6B involves a scale bar of 500 µm, while FIG. 6C involves a scale bar of 500 nm. It is to be noted that the structures respectively shown in FIG. 6B and FIG. 4B may be found their difference in comparison. From FIG. 6C, the silver nano-layer 21 may be found as having changed into a hollow dendritic shape.

Figure 7A:
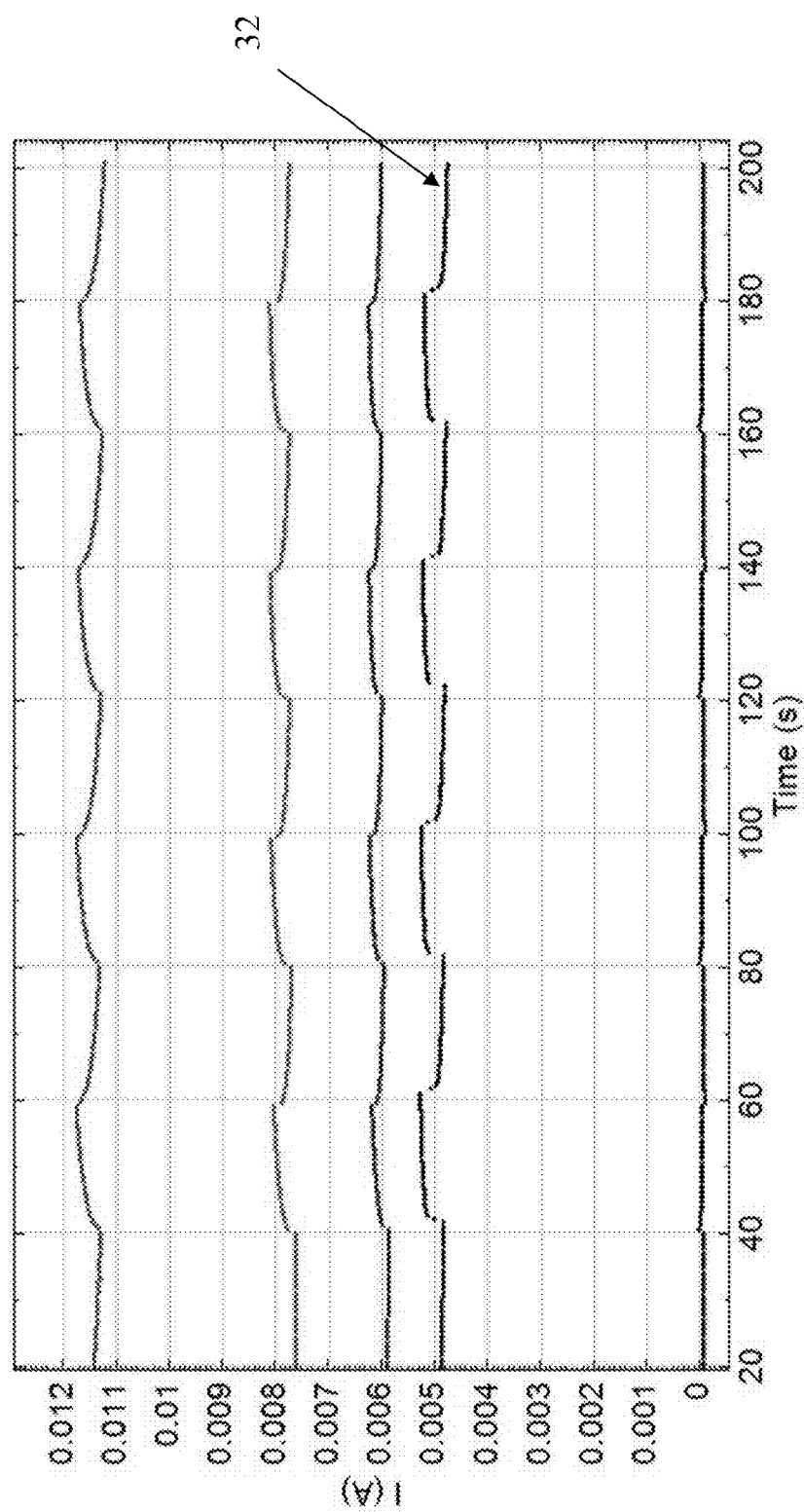
FIG. 7A is an actual structural diagram of the visible light response photocatalyst structure according to the first aspect of the present invention, respectively.
Figure 7B:
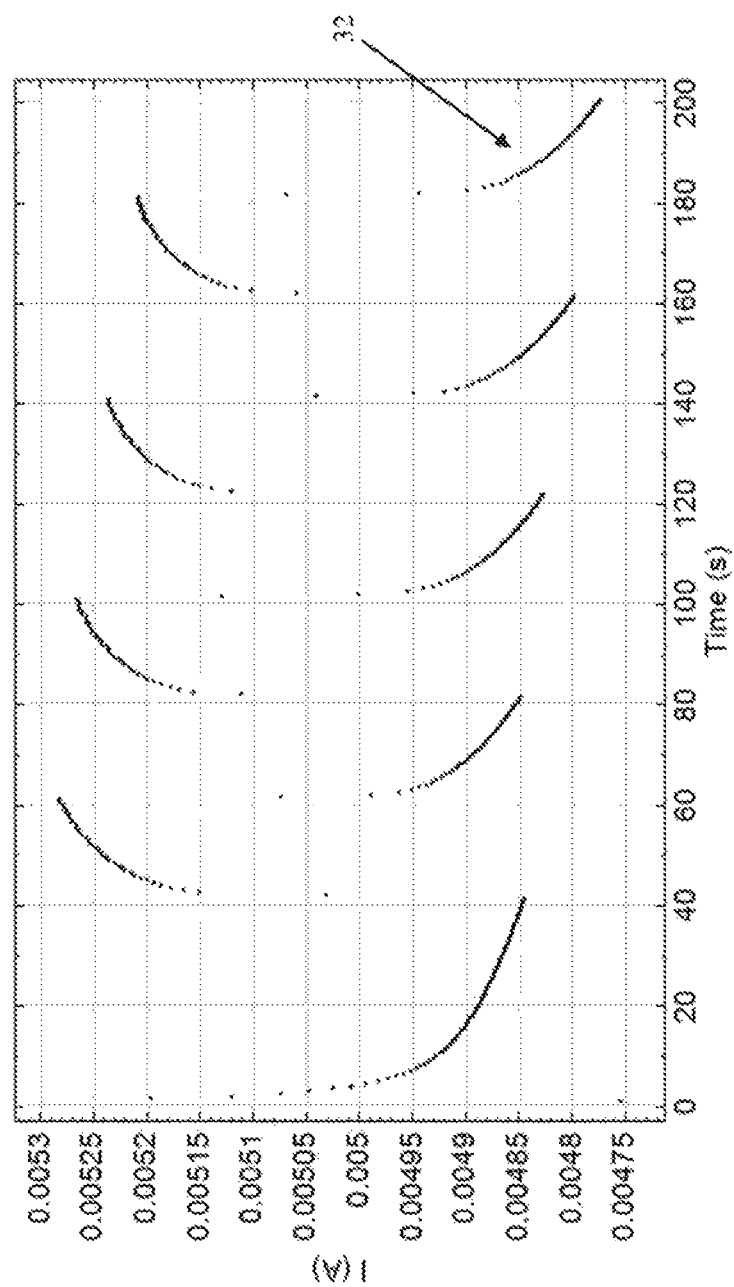
FIG. 7B is an actual amplified visible light response diagram of the visible light response photocatalyst structure according to the first aspect of the present invention, respectively.

Thereafter, referring to FIG. 7A and FIG. 7B, an actual structural diagram of the visible light response photocatalyst structure according to the first aspect of the present invention, respectively, and an actual amplified visible light response diagram of the visible light response photocatalyst structure according to the first aspect of the present invention, respectively, are shown, respectively.

As shown, a second data 32 may be found with the visible light response from the visible light photocatalyst structure at a portion thereof, the amplified second data 32 is otherwise shown in FIG. 7B.

To verify the visible light photocatalyust structure has already the visible light response, the second data 32 is obtained by providing a visible light source at the 40th seconds, 80th seconds, 120th seconds, etc., to the structure. The result shows that instantaneous data leaps are found on the second data 32 at the 40$^{th}$, 80$^{th}$, 120$^{th}$ seconds, and thus the evidence that the structure begins to have the visible light response at these time points is readily ascertained. Further, such structure may continuously maintain such visible light response. This may be evidenced by closing the visible light at some particular time points. On the second data 32, the data has a significant change at the 60th, 100th, 140th, etc., respectively, and which corresponds to the time points when the visible light is closed. It may be thus readily known that the structure does not show the visible light response again due to the absence of the visible light.

Figure 8A:
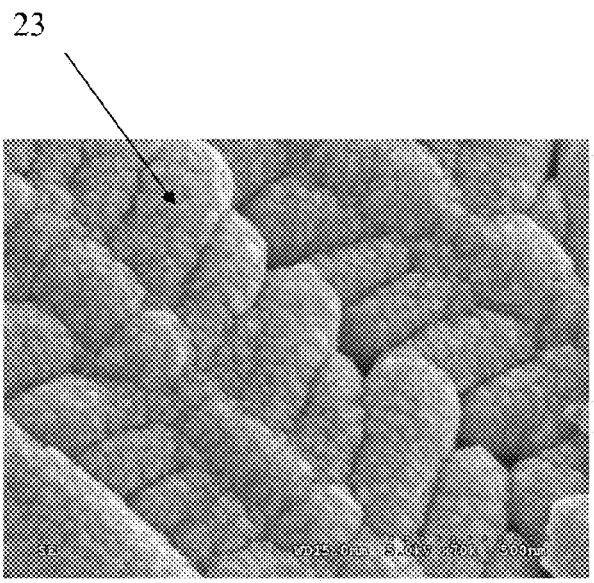
FIG. 8A through FIG. 8C are actual structural diagrams of the visible light response photocatalyst structure obtained by different magnifications according to the first aspect of the present invention, respectively.
Figure 8B:
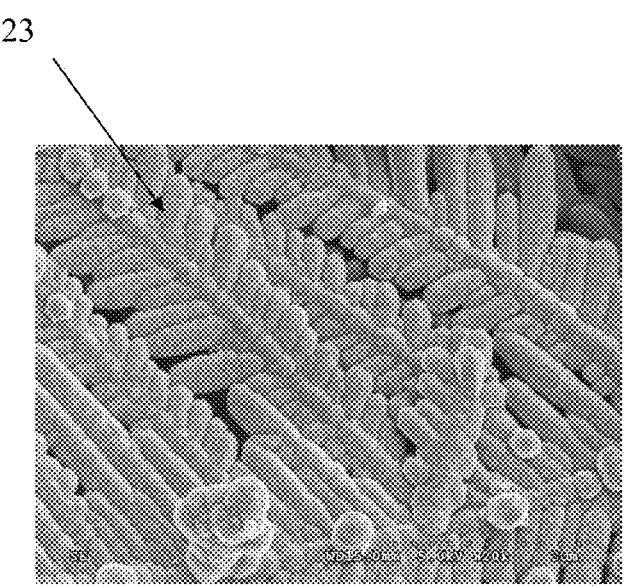
Figure 8C:
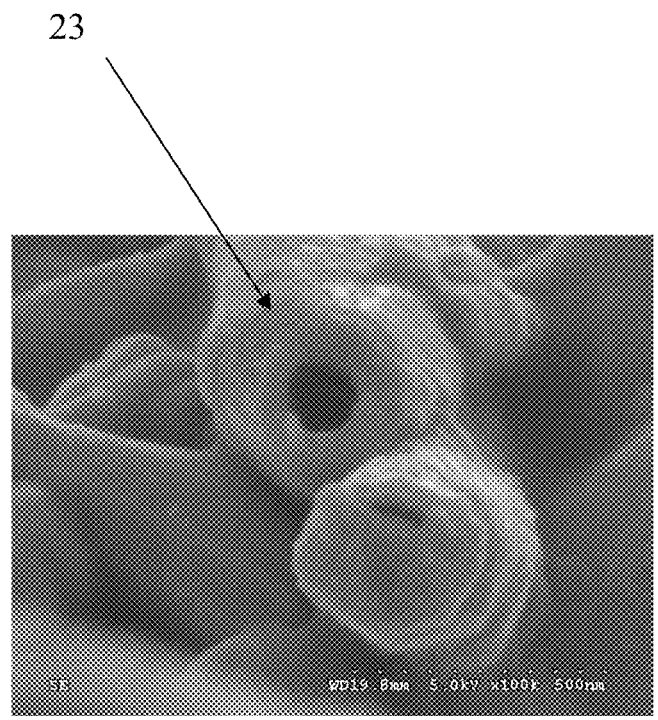

Thereafter, referring to FIG. 8A through FIG. 8C, actual structural diagrams of the visible light response photocatalyst structure obtained by different magnifications according to the first aspect of the present invention are shown, respectively.

Referring to FIG. 8A through FIG. 8C, actual structural diagrams of the visible light response photocatalyst structure obtained by different magnifications by using a microscope according to the present invention are shown therein, respectively, where the silicon substrate 10, the silver nano-layer 21 and $PtCl_6^{2-}$ have been subject to the second GRR for 1 hr. to form the visible light photocatalyst structure. FIG. 8A. FIG. 8A involves a scale bar of 500 nm, FIG. 8B involves a scale bar of 2μm, while FIG. 8C involves a scale bar of 500 nm. It is to be noted that the structures respectively shown in FIG. 8A and FIG. 6A may be found their difference in comparison, i.e. in the two cases the silver nano-layer 21, the precious metal layer 22 and the silver chloride layer 23 each have their thickness differences. From FIG. 8C, the silver nano-layer 21 may be found as having changed into a hollow dendritic shape.

Figure 9:
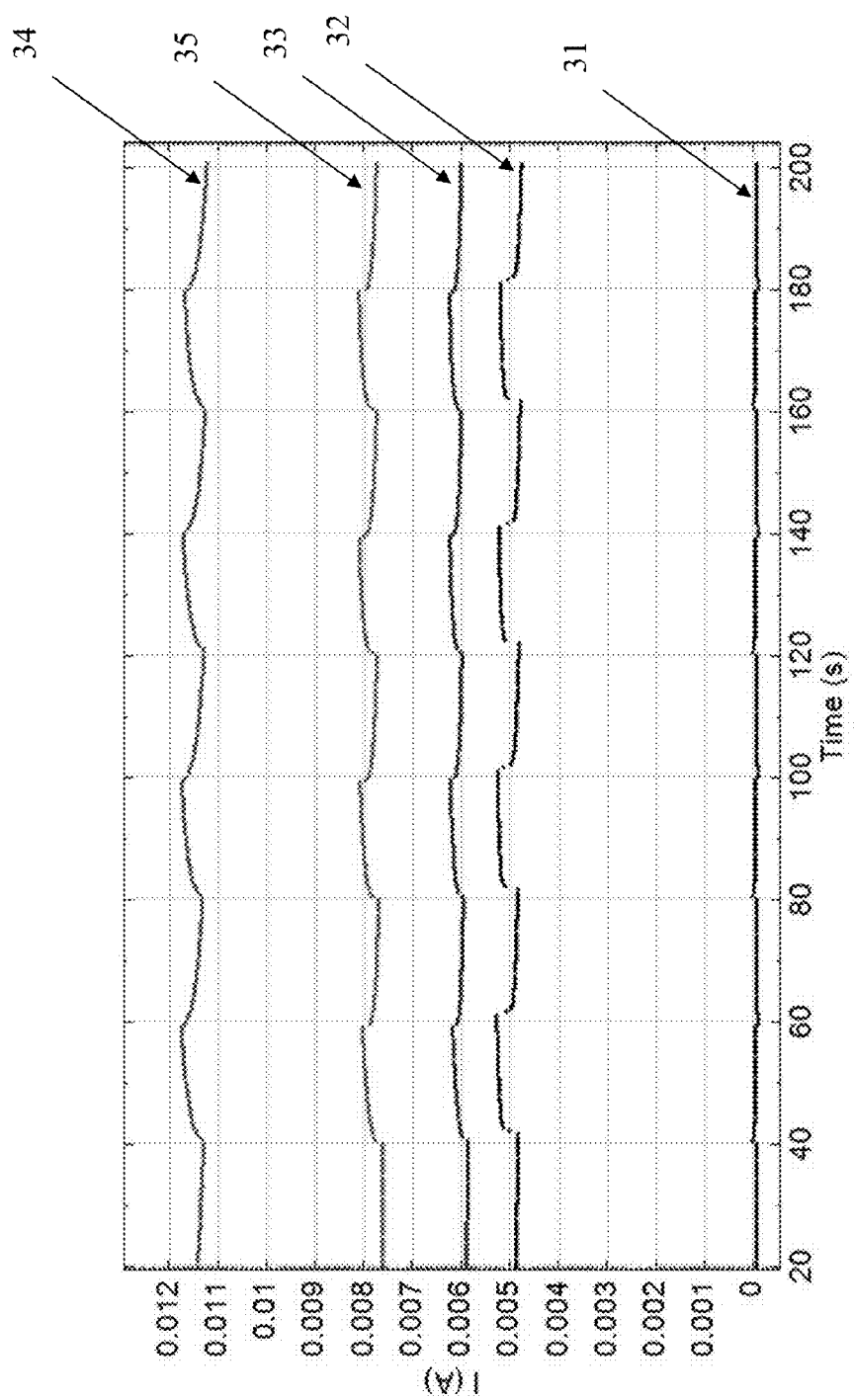
FIG. 9 is an actual structural diagram of the visible light response photocatalyst structure according to the first aspect of the present invention.

Thereafter, referring to FIG. 9, an actual structural diagram of the visible light response photocatalyst structure according to the first aspect of the present invention is shown therein.

As shown in FIG. 9, the actual data of the visible light photocatalyst structure having only the silver nano-layer 21 and the silicon substrate 10 is shown as the first data 31, the second data 32 is obtained from the case where the silicon substrate 10, the silver nano-layer 21 and $PtCl_6^{2-}$ are jointly subject to the second GRR for 5 min., the third data 33 is obtained from the case where the silicon substrate 10, the silver nano-layer 21 and $PtCl_6^{2-}$ are jointly subject to the second GRR for 1 hr., the fourth data 34 is obtained from the case where the silicon substrate 10, the silver nano-layer 21 and $PtCl_6^{2-}$ are jointly subject to the second GRR for 3 hr., while the fifth data 35 is obtained from the case where the silicon substrate 10, the silver nano-layer 21 and $PtCl_6^{2-}$ are jointly subject to the second GRR for 24 hr.

From a comparison among the second data 32 to the fifth data 35, it may be apparently known that the shorter the second GRR time is, such as 5 min., the netter result the visible light photocatalyst of the present invention is.

Referring again to FIG. 1 and FIG. 2, after the silver nano-layer 21 could grow on the surface of the silicon substrate 10 through the first GGR, the structure may be further placed into a solution having $PtCl_6^{2-}$, so that the silicon substrate 10, the silver nano-layer 21 and $PtCl_6^{2-}$ are jointly subject to a second GRR for 1 hr., for reinforcing the structure having only the silver nano-layer 21 and the silicon substrate 10, which is merely an example without limiting the present invention, and may be 5 min , 8 min., 24 hr., etc. The second GRR has the reaction equation: $4Ag+(PtCl_6)^{2-} \rightarrow Pt+4AgCl+2Cl^-$. In this manner, the precious metal layer 22 could grow on the surface of the silver nano-layer 21, and the silver chloride layer 23 could grow on the surface of the precious metal layer 22. And, grown silver nano-layer 21 has a hollow dendritic shape (S102). The visible light response catalyst structure is thus completed, and this structure is a AgCl—Au—Ag composite structure from an inward view.

Figure 10A:
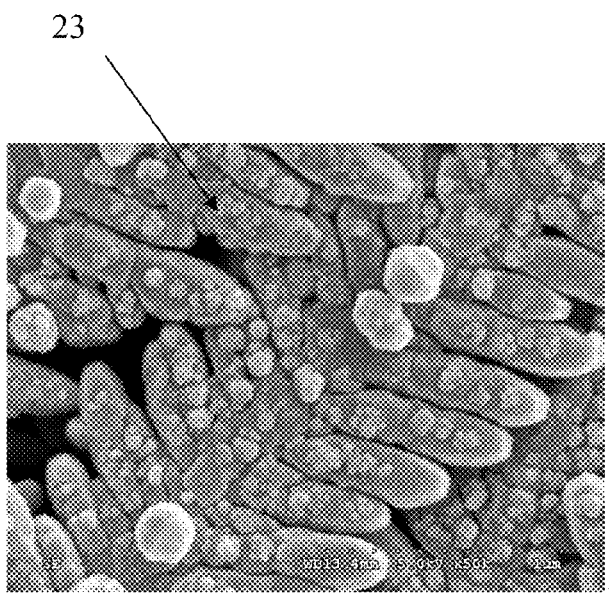
FIG. 10A through FIG. 10B are actual structural diagrams of the visible light response photocatalyst structure obtained by different magnifications according to the second aspect of the present invention, respectively.
Figure 10B:
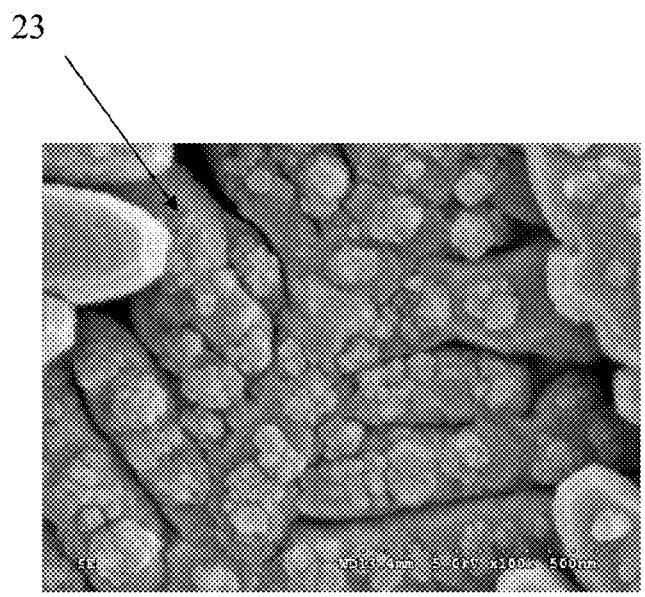

Thereafter, referring to FIG. 10A through FIG. 10B, actual structural diagrams of the visible light response photocatalyst structure obtained by different magnifications according to the second aspect of the present invention are shown therein, respectively.

FIG. 10A and FIG. 10B are actual structural diagrams of the visible light response photocatalyst structure obtained by different magnifications according to the second aspect of the present invention, respectively, where the silicon substrate 10, the silver nano-layer 21 and $PtCl_6^{2-}$ are jointly subject to the second GRR for 1 hr. FIG. 10A involves a scale bar of 1 μm, while FIG. 10B involves a scale bar of 500 nm. Regarding the precious metal layer 22, the first and second embodiments take Pt and Au as the layer 22, respectively. However, these are merely examples without limiting the present invention.

In summary, the structure and process of the present invention have the difference as compared to the prior art that the visible light response photocatalyst structure is manufactured by the GRR for two times, so that the structure has a large surface area, high surface activity, being apt to get integrated with a silicon substrate and endurable to the environment, and further has the rapid and simple manufacturing characteristics without any additional energy required and has a high reproductively.

By using the above technical means, the present invention may overcome the demerits of the prior art and achieve in manufacture of the visible light response photocatalyst structure by using the GRR.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A visible light response photocatalyst structure, comprising:
    a silicon substrate;
    a silver nano-layer, grown on a surface of the silicon substrate through a first galvanic replacement reaction (GRR) for 300-480 seconds and having a solid dendritic shape after experiencing the first GRR;
    a precious metal layer, grown on a surface of the silver nano-layer through a second GRR for 5 minutes: and
    a silver chloride layer, grown on a surface of the precious metal layer through the second GRR for 5 minutes,
    wherein, the silver-nano-layer has a hollow dendritic shape after experiencing the second GRR.

2. The visible light response photocatalyst structure as claimed in claim 1, wherein the first GRR is a fluorine ions assisted GRR, so that the silver nano-layer is grown on the surface of the silicon substrate.

3. The visible light response photocatalyst structure as claimed in claim 1, wherein the precious metal layer grown on the surface of the silver nano-layer through the second GRR has a precious metal material portion comprising gold (Au), palladium (Pd), and platinum (Pt).

4. The visible light response photocatalyst structure as claimed in claim 1, wherein the first GRR has a reaction equation: $Si+4^{31}\ Ag^++6HF \rightarrow 4Ag+H_2SiF_6+4H^+$.

5. The visible light response photocatalyst structure as claimed in claim 1, wherein the second GRR has a reaction equation: $4Ag+(PtCl_6)^{2-} \rightarrow Pt+4AgCl+2Cl^-$.

6. The visible light response photocatalyst structure as claimed in claim 1, wherein the second GRR has a reaction equation: $4Ag+HAuCl_4 \rightarrow Au+4AgCl+½H_2$.

7. The visible light response photocatalyst structure as claimed in claim 1, wherein materials of the visible light response photocatalyst structure viewed from an outer contour of the visible light response photocatalyst structure to an interior of the visible light response photocatalyst structure are AgCl, Pt, and Ag.

8. The visible light response photocatalyst structure as claimed in claim 1, wherein materials of the visible light response photocatalyst structure viewed from an outer contour of the visible light response photocatalyst structure to an interior of the visible light response photocatalyst structure are AgCl, Au, and Ag.

* * * * *